(12) United States Patent
Sozer (10) Patent No.: US 11,128,248 B2
(45) Date of Patent: Sep. 21, 2021

(54) DC INPUT CURRENT RIPPLE REDUCTION IN SRM DRIVE FOR HIGH VOLUMETRIC POWER DENSITY APPLICATIONS

(71) Applicant: Yilmaz Sozer, Stow, OH (US)

(72) Inventor: Yilmaz Sozer, Stow, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 16/969,012

(22) PCT Filed: Feb. 21, 2019

(86) PCT No.: PCT/US2019/018887
§ 371 (c)(1),
(2) Date: Aug. 11, 2020

(87) PCT Pub. No.: WO2019/165026
PCT Pub. Date: Aug. 29, 2019

(65) Prior Publication Data
US 2021/0028737 A1    Jan. 28, 2021

Related U.S. Application Data

(60) Provisional application No. 62/633,288, filed on Feb. 21, 2018.

(51) Int. Cl.
*H02P 25/098*    (2016.01)
(52) U.S. Cl.
CPC .................................. *H02P 25/098* (2016.02)
(58) Field of Classification Search
USPC ........................................................ 318/560
See application file for complete search history.

(56) References Cited

U.S. PATENT DOCUMENTS

| 4,933,621 A | * | 6/1990 | MacMinn | ............. | H02P 25/092 |
| | | | | | 310/163 |
| 5,166,591 A | * | 11/1992 | Stephens | ................... | H02P 9/40 |
| | | | | | 318/701 |
| 5,457,375 A | | 10/1995 | Marcinkiewicz et al. | .... | 318/802 |
| 6,639,378 B2 | | 10/2003 | Turner et al. | .................. | 318/701 |

(Continued)

FOREIGN PATENT DOCUMENTS

| EP | 1 903 667 A1 | 3/2008 | ................ H02P 5/68 |
| JP | 2002 051589 A | 2/2002 | .............. H02P 21/00 |

OTHER PUBLICATIONS

International Search Report dated Jun. 17, 2019 in related application No. PCT/US2019/018887.

(Continued)

*Primary Examiner* — Bentsu Ro
(74) *Attorney, Agent, or Firm* — Renner, Kenner, Greive, Bobak, Taylor & Weber (57) ABSTRACT

A control system for a switched reluctance machine includes a capacitor and an inverter connected to the capacitor, wherein the inverter generates current signals and a ripple current returned to the capacitor. A switched reluctance machine (SRM) receives the current signals and generates a position signal. A controller receives the ripple current, current signal values of the current signals, and the position signal and generates desired reference current waveforms received by the inverter to adjust the current signals received by the SRM.

12 Claims, 7 Drawing Sheets

(56) References Cited

U.S. PATENT DOCUMENTS

| | | | |
|---|---|---|---|
| 8,373,372 B2 | 2/2013 | Su | 318/400.27 |
| 2002/0153858 A1* | 10/2002 | Schulz | H02P 25/092 |
| | | | 318/701 |
| 2002/0185989 A1* | 12/2002 | Rahman | H02P 25/098 |
| | | | 318/701 |
| 2004/0079173 A1 | 4/2004 | Neely et al. | 73/862.333 |
| 2011/0012544 A1* | 1/2011 | Schulz | B60L 15/025 |
| | | | 318/400.02 |
| 2014/0239857 A1* | 8/2014 | Kamada | H02P 25/092 |
| | | | 318/254.2 |

OTHER PUBLICATIONS

Written Opinion dated Jun. 17, 2019 in related application No. PCT/US2019/018887.

\* cited by examiner

DC INPUT CURRENT RIPPLE REDUCTION IN SRM DRIVE FOR HIGH VOLUMETRIC POWER DENSITY APPLICATIONS

CROSS-REFERENCE TO RELATED APPLICATIONS

This application claims priority of U.S. Provisional Application Ser. No. 62/633,288 filed Feb. 21, 2018, which is incorporated herein by reference.

STATEMENT REGARDING FEDERALLY-SPONSORED RESEARCH OR DEVELOPMENT

This invention was made with government support under Contract No. DE-EE0006521M0012 awarded by The US Department of Energy. The government has certain rights in the invention.

TECHNICAL FIELD

The present invention is directed to switched reluctance machines. Specifically, the present invention is directed to a control method for reducing DC input current to switched reluctance machines so as to obtain high volumetric power density.

BACKGROUND ART

Switched reluctance machines (SRMs), which are also known as switch reluctance motors, are potential candidates in AC and DC drive applications because of their wide adjustable speed range. SRMs have several advantages which include high starting torque, high speed, high efficiency, and high torque-inertia ratio. The manufacturing cost of SRMs is inexpensive because of their simple mechanical construction. Additionally, their unidirectional drive features enable simple power electronic circuit requirements. And an inverter drive used in SRMs is free from shoot-through fault which is very common in conventional inverters and this feature makes the system robust. Furthermore, the fault tolerant features in SRMs provide efficient operation in harsh environments such as automotive, aerospace and the like, while providing a high degree of reliability. SRMs are gaining attention as a competitor with the other motor types for electric vehicles (EV) and hybrid electric vehicles (HEV) for its construction simplicity and ruggedness, and extremely high-speed operation capability.

Despite their numerous advantages, SRMs have high torque ripple due to the highly non-linear and non-uniform nature of the torque production which varies with size and construction of the motor. And SRMs exhibit some negative consequences such as undesirable acoustic noise and vibration, and DC current ripple at the inverter input side. Additionally, such machines introduce harmonics on the input DC currents and require higher DC link capacitor values. The large size capacitor requirement increases the size of the drive system and eventually reduces the volumetric power density.

There are different methods for minimizing torque ripple which can be divided into two methods. First, the torque ripple can be minimized by refining machine design where torque, current, and rotor position characteristics are derived from measured data or finite element analysis. This data is then used to control current for a given desired torque level and a given rotor position. Unfortunately, this technique is explicit for a specific design. Second, torque ripple can be minimized by utilizing a control algorithm through the converter. There are different control algorithms to reduce the torque ripple, but there is no known configuration to reduce the input current ripple directly for SRMs. Generally, a DC-link capacitor is always connected as an intermediate energy storage element to balance the instantaneous power difference between the source and load in all motor drives and to stabilize the input voltage of the voltage source converter (VSC). Therefore, the DC link capacitor is connected in parallel with the power source to provide stiff voltage value and to absorb the ripple from the DC input current.

Since the ripple current absorbed by the capacitor directly impacts the lifetime of the capacitor, the dc-link capacitor needs to have high current ripple capability. However, the volume of the capacitor increases as the ripple current increases. Therefore, reducing the ripple current is effective in downsizing the capacitor bank. For high power density and efficient drive system operation, DC-link current ripple should be attenuated.

Different techniques used to reduce the DC link current ripple are known. The most commonly used technique is adding another power conversion stage (i.e. a DC/DC converter) between the battery and the inverter to regulate the input voltage and current. This adds more cost, size, and complexity to the system. Applying complex switching control algorithms based on analytical model of the DC link current are also known in the art. Increasing the value of the capacitor bank is a simple solution, but the size of the overall design will increase and the power density of the overall drive (kW/L) will decrease. A further consideration is the end use application. The SRM drive may be used in automotive applications where the size is a major challenge. Therefore, the whole drive should have a compact size.

Therefore, there is a need in the art for a control scheme implemented with a SRM to reduce the DC current ripple without affecting the machine's performance. In the control scheme, there is a need for the DC current ripple to be minimized to an acceptable/allowable range. As disclosed below, these needs are met by shaping the reference current while considering the ripple components of the input DC current. As a result, the minimum capacitor requirement can be achieved which enables a reduction in the size of the associated inverter and which also increases the volumetric power density of the overall system.

SUMMARY OF THE INVENTION

In light of the foregoing, it is a first aspect of the present invention to provide a DC input current ripple reduction in an SRM drive for high volumetric power density.

It is another aspect of the present invention to provide a control system for a switched reluctance machine, comprising a capacitor, an inverter connected to the capacitor and generating current signals and a ripple current returned to the capacitor, a switched reluctance machine (SRM) receiving the current signals and generating a position signal, and a controller receiving the ripple current, current signal values of the current signals, and the position signal, and generating desired reference current waveforms received by the inverter to adjust the current signals received by the SRM.

Still another aspect of the present invention is to provide the control system with a high pass filter connected to the capacitor, the capacitor receiving the ripple current and filtering low frequency currents and sending high frequency components to the controller. In this aspect, the high pass filter passes high frequency components to about 32 Hz and above.

Yet another aspect of the present invention is to provide the control system wherein the ripple current is compared to a desired ripple current value for use in generating the desired reference current waveforms. In this aspect the position signal is converted to an actual speed signal and is compared to a reference speed signal for use in generating the desired reference current waveforms. This aspect also may provide a first proportional integral controller for receiving a difference between the actual speed signal and the reference speed signal so as to generate a reference current signal, and a second proportional integral controller for receiving a difference between the ripple current and the desired ripple current so as to generate an adjustment signal, and an adjustment circuit to receive the reference current signal and the adjustment signal to generate the desired reference current waveforms. And the adjustment circuit may use the equation $i_{ref}(\theta,\omega_{ref})=[I_{PI1}(\omega_{actual},\theta)-I_{PI2}(I_{DC\ ripple})]$ wherein $I_{PI1}$ is the adjustment signal and $I_{PI2}$ is the reference current signal.

It is still another aspect of the present invention's method to provide a method for reducing DC input current ripple, comprising connecting an inverter to a capacitor and generating current signals; receiving the current signals in a switched reluctance machine (SRM) which generates a ripple current received by the capacitor and a position signal; receiving the ripple current, current signal values of the current signals and the position signal in a controller which generates desired reference current waveforms; and receiving the desired reference current waveforms in the inverter to adjust the current signals in the SRM and reduce the ripple current.

Yet another aspect of the present invention's method is to provide the step of receiving the ripple current in a high pass filter from the capacitor and sending selected high frequency components of the ripple current to the controller. The aspect may also provide the step of comparing the ripple current to a desired ripple current value for use in generating the desired reference current waveforms. A further aspect of the invention's method is providing the steps of converting the position signal to an actual speed signal, and comparing the actual speed signal to a reference speed signal for use in generating the desired reference current waveforms. And other aspects of the invention's method provide the steps of receiving a difference between the actual speed signal and the reference speed signal in a first proportional integral controller which generates a reference current signal, receiving a difference between the ripple current and the desired ripple current in a second proportional integral controller which generates an adjustment signal, and receiving the reference current signal and the adjustment signal in an adjustment circuit to generate the desired reference current waveforms.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

In general, a DC link current ripple reduction in a switched reluctance machine (SRM) drive by current profiling is disclosed. A main objective of a control system and associated algorithm is to inject an appropriate amount of the current ripple obtained from a DC link current to a reference current of the SRM in order to generate optimal current profiles while maintaining the machine performance unchanged. As alluded to above, the ripple current is generated by the inverter due to the non-linear behavior of the SRM. The inverter is generating phase currents received by the SRM. Output power from the inverter to the SRM is very close to the input power to the inverter from the battery. Since the SRM has non-linear behavior, the power taken by the SRM has a ripple, which impacts the power taken by the inverter from the battery. As a result, a steady DC bus voltage ripple on the input power to the inverter means a ripple on the DC bus current.

Figure 1:
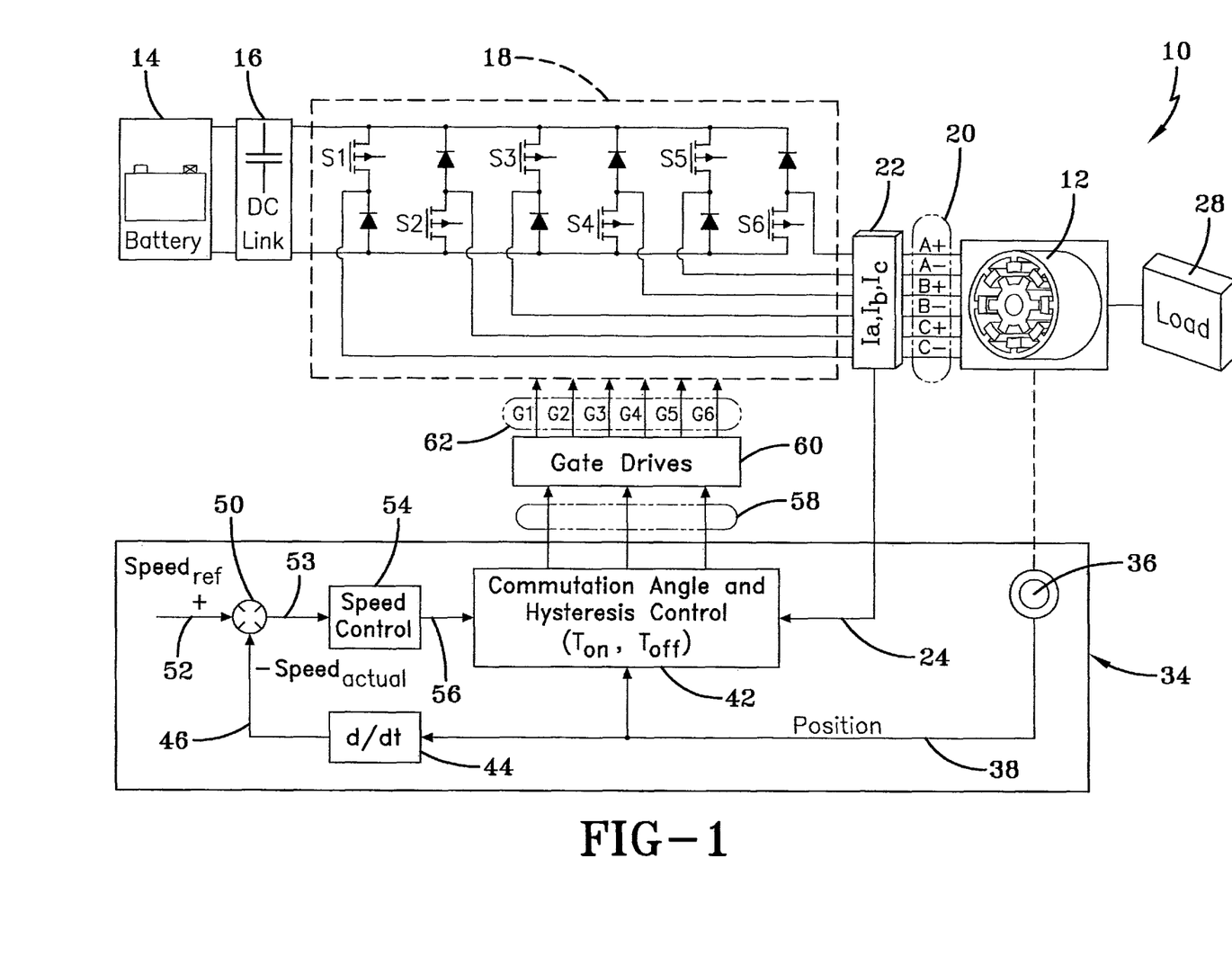
FIG. 1 is a schematic diagram of a switched reluctance machine (SRM) and associated control system according to the concepts of the present invention.

Referring now to the drawings, and in particular to FIG. 1, it can be seen that a control system which may incorporate an associated algorithm is designated generally by the numeral 10. As can be seen, the system 10 includes a switched reluctance machine (SRM) 12, which may be of any various sizes. As will be understood by those skilled in the art, the SRM 12 provides for observable characteristics such as torque, speed, and power control, to name a few. A battery 14 powers the SRM 12, wherein a DC link capacitor 16 is connected in parallel to the battery. Connected in parallel to the capacitor 16 may be an inverter 18. Although various types of inverters may be employed, the present embodiment employs an asymmetric half bridge which comprises insulated gate bipolar transistors (IGBT) S1-S6 and associated diodes wherein the inverter 18 is employed to invert the DC power transferred by the capacitor into a three-phase signal ($I_a$, $I_b$, $I_c$) received by the SRM 12. The inverter generates phase currents 20 (shown as A+, A−, B+, B−, C+, and C− in FIG. 1) which are monitored by a corresponding current sensor 22 so as to determine the values of current phases $I_a$, $I_b$, and $I_c$. The current sensors 22 generate a sensed current signal 24. In any event, the phase currents 20 are delivered to the SRM 12 which in turn powers or drives a load 28.

Associated with the SRM 12 and the inverter 18, which are a part of the control system 10, may be a speed controller 34. Skilled artisans will appreciate that the speed controller 34 monitors the operation of the SRM and other components of the system 10 and assists in providing input to the inverter 18 so as to adjust the currents received by the SRM 12.

Associated with the SRM 12 may be a resolver 36. In particular, the resolver 36 is coupled to a rotor of the SRM 12 and an associated decoder to determine a rotor position of the SRM 12 wherein this information is input to the speed controller 34. The resolver generates a position signal 38 which is received by a commutation angle and hysteresis control 42 which also receives the sensed current 24 from the current sensors 22. The position signal 38 may also be delivered to an integrator, shown as d/dt in FIG. 1, so as to generate a speed $_{actual}$ value 46.

A summation circuit 50 may receive a negative value of the speed $_{actual}$ value 46 along with a speed $_{ref}$ value 52. The speed $_{ref}$ value 52 may be input by a user to obtain a desired operation of the SRM. In other embodiments the value 52 may be automatically adjusted based on predetermined or observed operating characteristics of the system 10. In any event, the summation circuit 50 may generate a speed adjustment value 53 that is delivered to a speed control circuit 54. The speed control circuit delivers a control signal 56 to the commutation angle and hysteresis control 42 which together with the observed position signal 38 and the sensed current signal 24 generates adjustment signals 58 which are delivered to gate drives 60. It will be appreciated that there may be a gate drive 60 associated with each corresponding IGBT S1-S6 incorporated into the inverter 18. Accordingly, the gate drives generate gate signals G1-G6 62 which are received by a corresponding transistor S1-S6 in the inverter.

In summary, the control system 10 provides for an asymmetric half bridge inverter 18 to generate supply phase currents for use as individual phases by the SRM 12. Although there are many strategies to control the operation of SRM 12 such as torque, speed, or power control, the present embodiment employs the speed controller as an outer loop to determine the level of the phase currents. The speed controller 34 defines a reference current to maintain a desired speed level. As noted, the resolver 36, which is connected to the shaft of the SRM 12, detects the position of the SRM's rotor and a decoder is used to obtain the rotor position. The commutation angle and hysteresis control 42 receives the reference sensed current signal 24 and defines the current commutation time interval for each phase based on the turn-on ($T_{on}$) and turn-off ($T_{off}$) angles associated with the commutator of the SRM 12. Within the commutation angle and hysteresis control 42 may be a hysteresis current block which controls the current in a desired range and manages the timing gate signals 62 of the transistors maintained in the inverter block. Next, the inverter 18 manages phase voltages to supply the desired current to each phase. Phase current sensors 22 may feed the commutation angle and hysteresis current control to supply accurate current values to each phase winding.

In the present embodiment, SRM speed and DC link current ripple may be utilized as system feedbacks which may be controlled so as to reduce the DC link current while keeping the SRM 12 at the desired speed.

Figure 2:
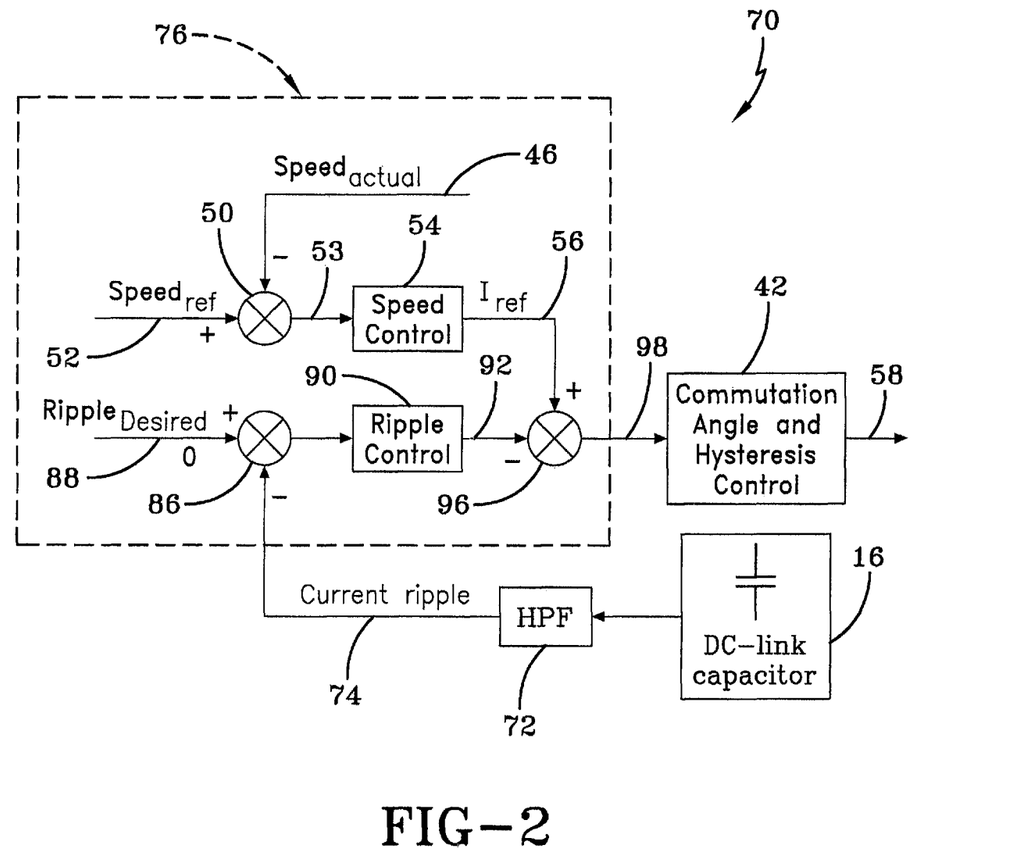
FIG. 2 is a schematic diagram of a current ripple reduction circuit incorporated into the control system for the SRM according to the concepts of the present invention.
Figure 3A:
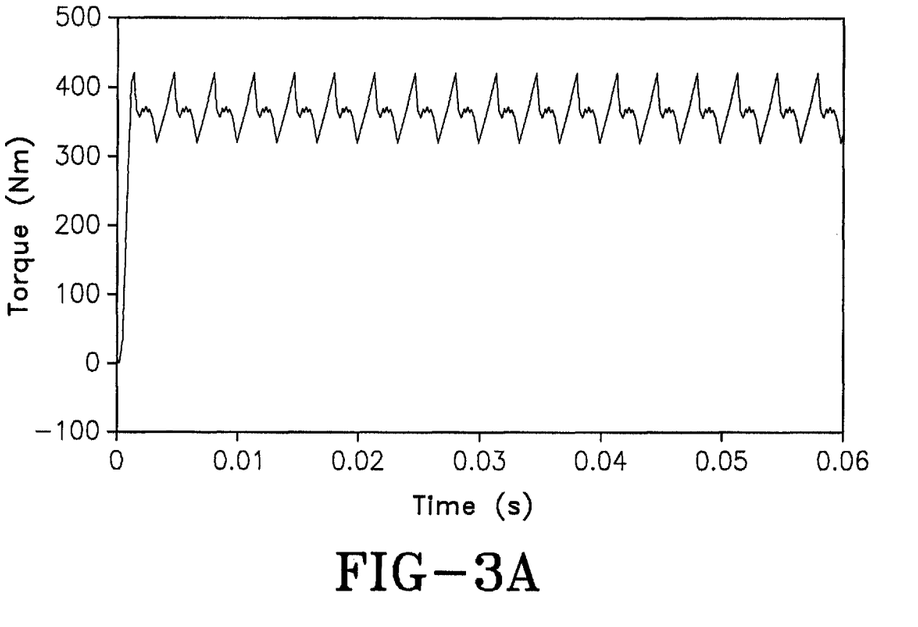
FIGS. 3A-D are graphical representations of torque profile, phase current, input DC current and a fast Fourier transform of a SRM without a speed control.
Figure 3B:
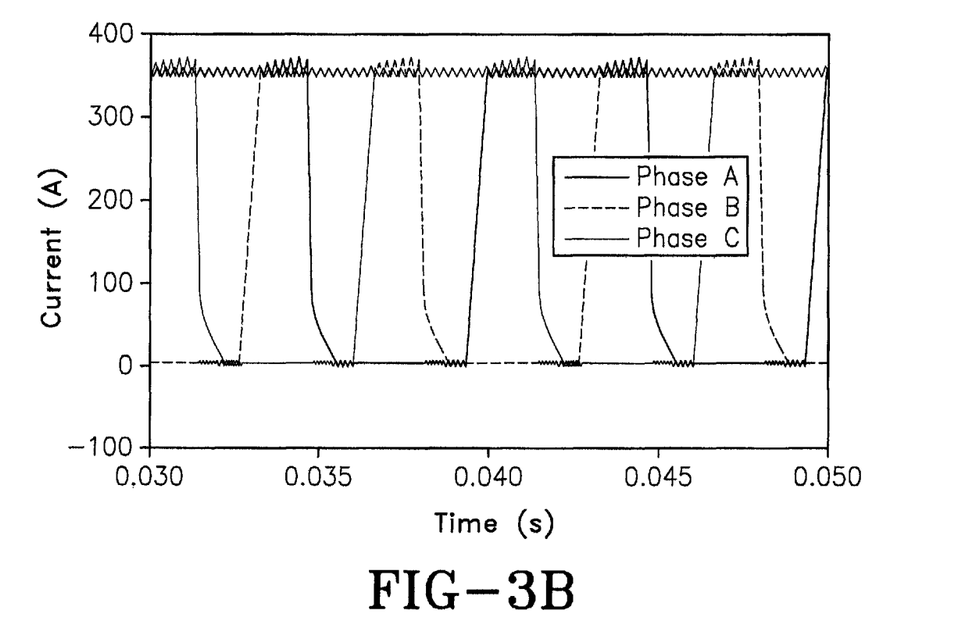
Figure 3C:
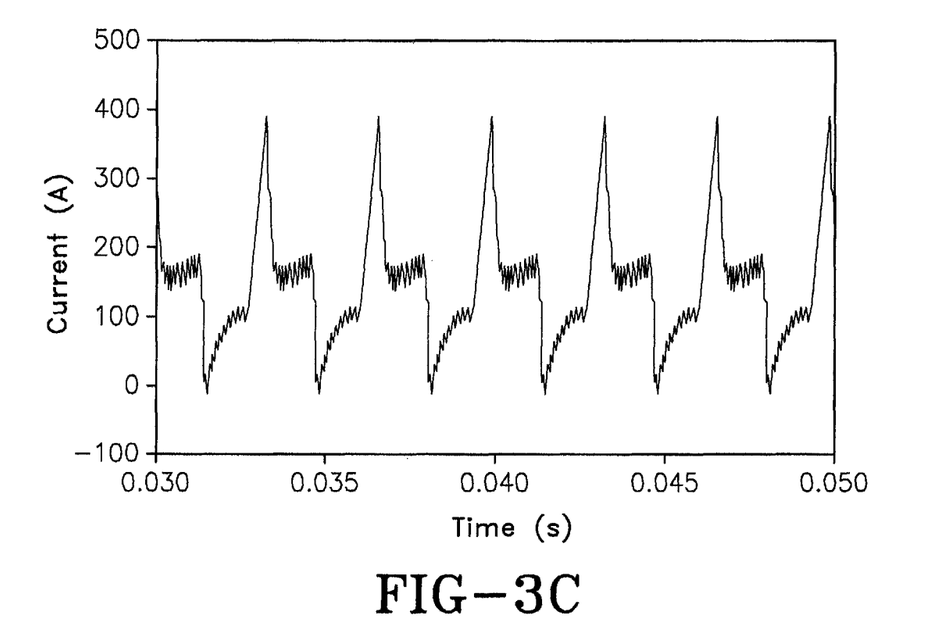
Figure 3D:
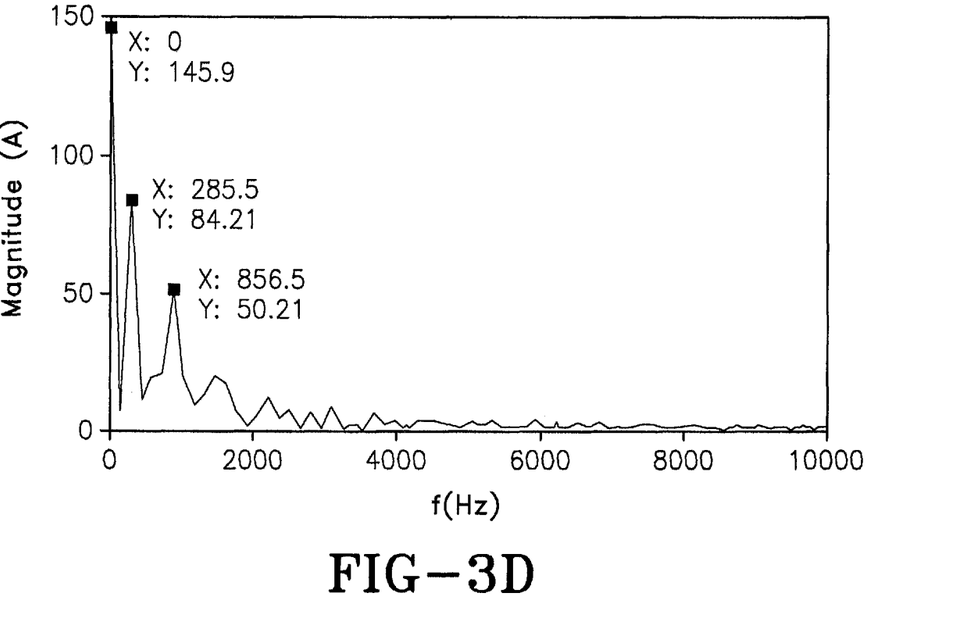
Figure 4A:
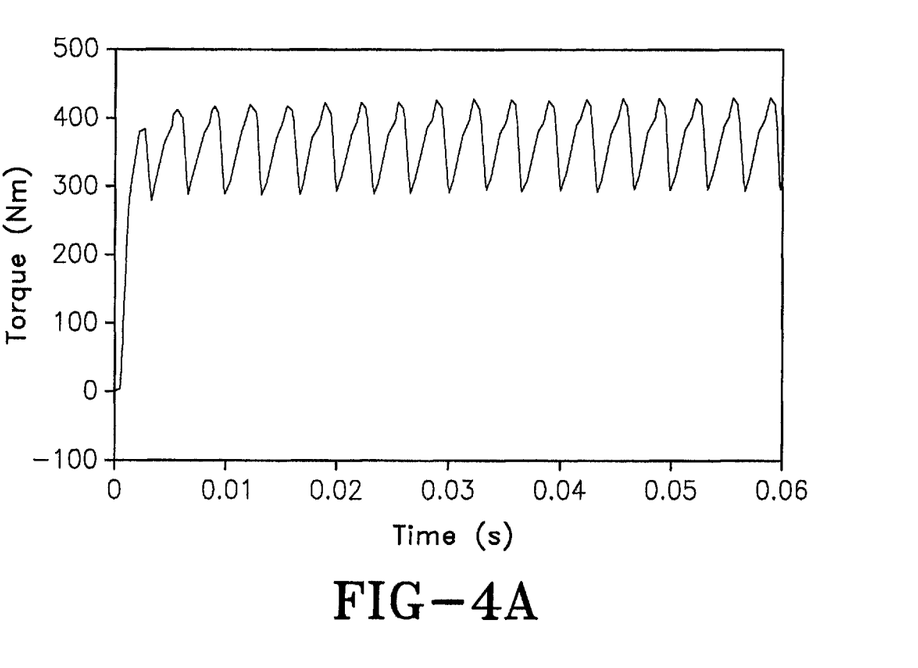
FIGS. 4A-D are graphical representations of torque profile, phase current, input DC current and a fast Fourier transform of a SRM obtained from a current ripple reduction circuit according to the concepts of the present invention.
Figure 4B:
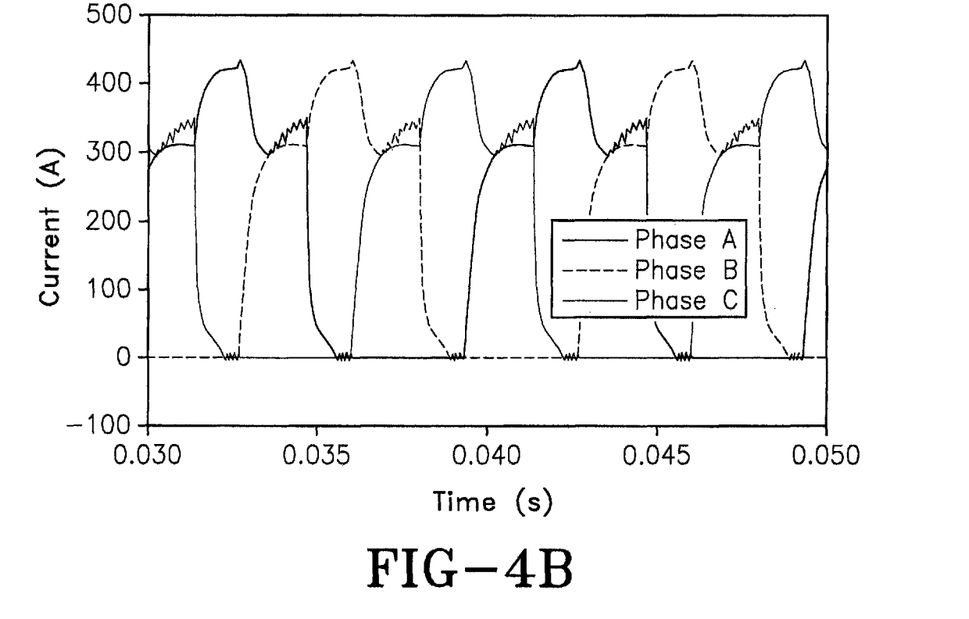
Figure 4C:
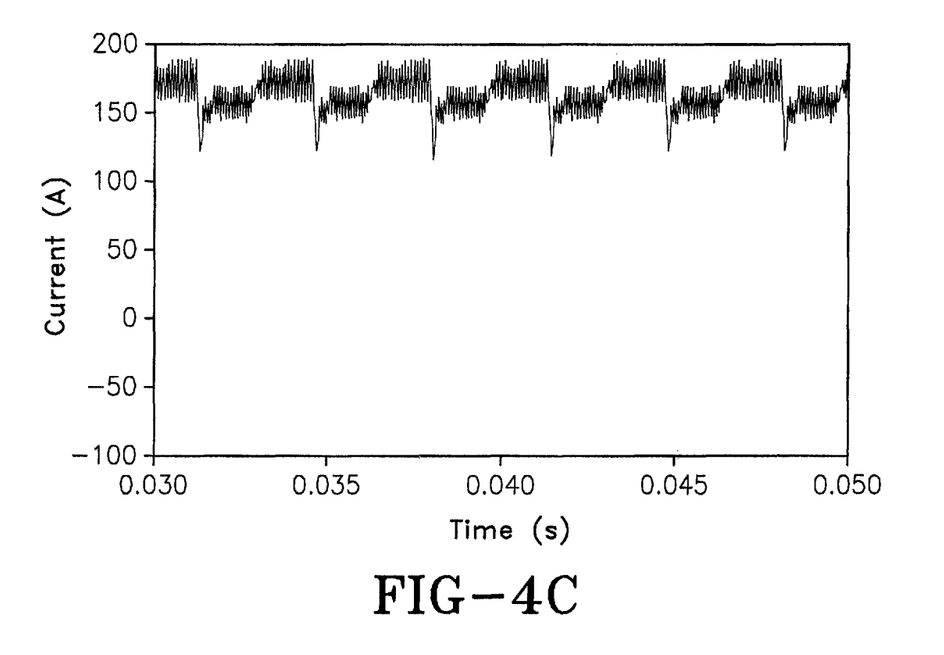
Figure 4D:
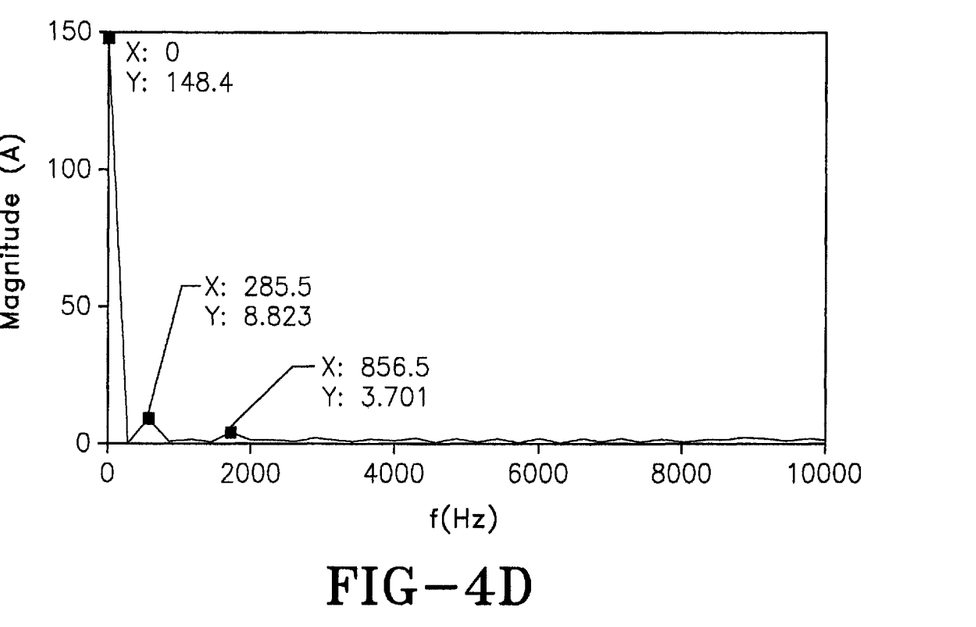

Referring now to FIG. 2, it can be seen that a current ripple reduction circuit is designated generally by the numeral 70 and which may be directly incorporated into the controller 34 or may be otherwise connected to the controller 34. The circuit 70 monitors the DC link capacitor 16 for the purposes of reducing the ripple current generated thereby. The capacitor 16 may be connected to a high pass filter (HPF) 72 which generates a current ripple signal 74. As will be understood by skilled artisans, the filter 72 may be configured to remove unwanted or undesired low frequency components detrimental to operation of the system 10. The current ripple signal 74 is delivered to a speed and ripple controller designated generally by the numeral 76 which receives the current ripple signal 74 along with the speed $_{actual}$ value 46.

The controller 76 employs a proportional integral controller in the speed control 54 which receives the summation signal 53 generated by the summation circuit 50. The controller 54 accordingly generates the $I_{ref}$ signal 56. In a somewhat similar manner, a summation circuit 86 receives a ripple $_{Desired}$ value 88, which may be input by a user or otherwise set, and a negative value of the current ripple signal 74. The circuit 86 generates a signal which is received by a proportional integral controller in a ripple control 90 so as to generate an adjustment signal 92.

An adjustment circuit 96 receives both a negative value of the adjustment signal 92 and the $I_{ref}$ signal 56 so as to generate desired reference current waveforms 98 which are received by the commutation angle and hysteresis control 42. The control 42 may then generate and deliver the adjustment signals 58 to the gate drives 60, as shown in FIG. 1, for delivery of the gate signals 62 to the corresponding transistors S1-S6 for use by the inverter 18.

In summary, the outer speed controller 34, with the incorporated current ripple reduction circuit 70, operates at a lower bandwidth and generates a desired average value for the phase currents. In order to acquire DC link current ripple, the high pass filter 72 is implemented. The DC link current ripple is processed through the controller 76 to generate a profile to be added to the average reference current waveform. The output of the controls 54 and 90 are coordinated through the control algorithm in circuit 96 to generate the desired reference current waveforms 98 using Equation 1:

$$i_{ref}(\theta,\omega_{ref})=[I_{PI1}(\omega_{actual},\theta)-I_{PI2}(I_{DC\,ripple})] \quad (1)$$

Where, $I_{PI1}$ and $I_{PI2}$ are the output of the controls 54 and 90 from the speed and DC link current ripple block respectively. DC ripple refers to the current ripple signal 74. Furthermore, $\theta$ represents the rotor position of the SRM 12, $\omega_{ref}$ represents the desired rotor speed and $\omega_{actual}$ is the actual rotor speed.

Equation 2 describes the transfer function of the high pass filter (HPF) 72. The cut-off frequency of the HPF in the present embodiment is chosen 32 Hz such that it filters the DC and low frequency components around the DC and sends the high frequency components to the controller.

$$H(s) = \frac{Ts}{1+Ts} \quad (2)$$

Wherein T is the coefficient of the high pass filter 72, and s is a complex mathematical complex frequency domain for the Laplace transformation.

The system 10 and the reduction circuit 70 of the present embodiment are designed for an automotive application where space is limited and where the power density requirement is high. Skilled artisans will appreciate that the system 10 and the reduction circuit 70 may be used in many other applications. The parameters of the system 10 and the reduction circuit 70 are shown in Table I. For the specified size, a 2 mF DC link capacitor is used at most. Unfortunately, the input ripple, without a ripple reduction control, is found as 275% by using this value, which is very high.

TABLE 1

| Parameter | Value |
| --- | --- |
| Average Torque | 360 Nm |
| Speed | 500 rpm |
| Reference Current | 350 A |
| Input Battery Voltage | 350 V |
| DC Link Capacitor | 2 mF |

FIGS. 3A-D show the torque profile, phase currents, input DC current and its Fourier components without a speed control. The allowable ripple is set to be around 50%. FIGS. 4A-D show the results after implementing the control scheme with the current ripple reduction circuit where the input current ripple decreases to 47.97%. It is also evident in comparing the Fourier analysis in FIGS. 3D and 4D, where the major ripple components are decreased to a lower value than the ripple of the DC input current obtained in the conventional scheme. The comparison of torque, voltage and current ripple is shown in Table II below. From FIGS. 3A and 4A, it can be seen that the torque profile is almost unchanged as well as the efficiency of the SRM.

TABLE II

| | Without control | With ripple control |
| --- | --- | --- |
| Input Voltage Ripple (%) | 6.07 | 1.73 |
| Input Current Ripple (%) | 275.86 | 47.97 |
| Torque ripple (%) | 27.78 | 27.02 |
| Torque per phase RMS current (Nm/A) | 1.446 | 1.478 |

Figure 5:
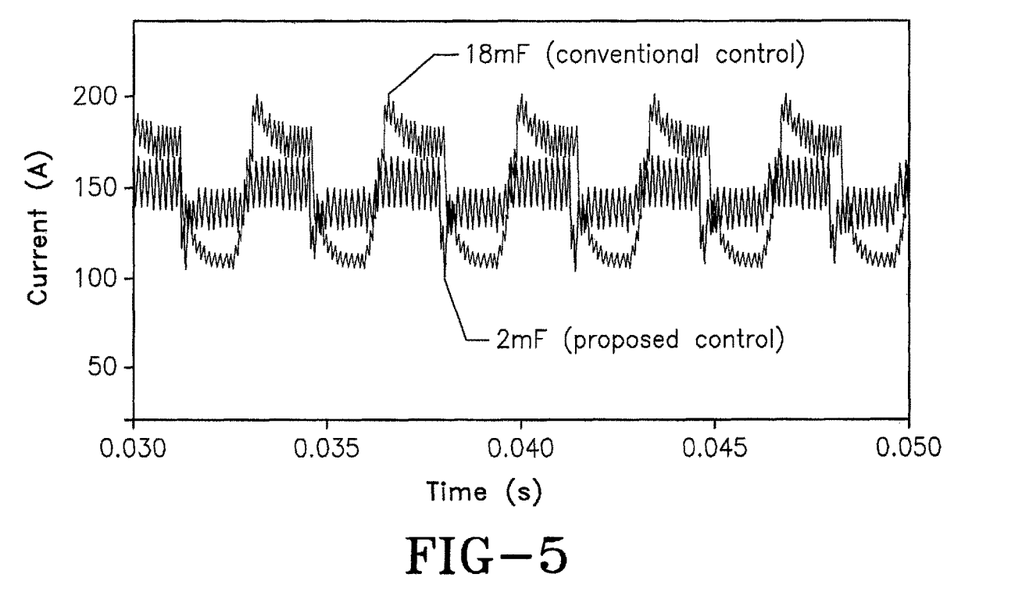
FIG. 5 is a graphical representation showing a battery input current comparing a 18 mF capacitor yield with the same ripple current as a 2 mF would with the inventive current ripple reduction circuit according to the concepts of the present invention.

In order to observe the effect of this technique on the size of the overall system and thus on the volumetric power density, the simulation is performed to achieve the required ripple by increasing the value of capacitance without the control scheme. It is found that an 18 mF capacitor yields same ripple current as the 2 mF capacitor would with the proposed control. FIG. 5 shows the battery input current in both cases with same peak-to-peak ripple. So, utilizing the control disclosed herein, a smaller capacitor is required which leads to an increase in the volumetric power density.

The disclosed system 10 has many advantages. First, reduction of DC link current ripple in the SRM drive is performed to achieve high volumetric power density and compact size requirement. The allowable ripple is achieved without modifying the performance of the SRM machine. This facilitates SRM use in automotive and other applications.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A control system for a switched reluctance machine, comprising:
a capacitor;
an inverter connected to said capacitor and generating current signals and a ripple current returned to said capacitor;
a switched reluctance machine (SRM) receiving said current signals and generating a position signal; and
a controller receiving said ripple current, current signal values of said current signals, and said position signal, and generating desired reference current waveforms received by said inverter to adjust said current signals received by said SRM.

2. The system according to claim 1, comprising:
a high pass filter connected to said capacitor, said capacitor receiving said ripple current and filtering low frequency currents and sending high frequency components to said controller.

3. The system according to claim 2, wherein said high pass filter passes high frequency components to about 32 Hz and above.

4. The system according to claim 2, wherein said ripple current is compared to a desired ripple current value for use in generating said desired reference current waveforms.

5. The system according to claim 4, wherein said position signal is converted to an actual speed signal and is compared to a reference speed signal for use in generating said desired reference current waveforms.

6. The system according to claim 5, further comprising:
a first proportional integral controller for receiving a difference between said actual speed signal and said reference speed signal so as to generate a reference current signal;
a second proportional integral controller for receiving a difference between said ripple current and said desired ripple current so as to generate an adjustment signal; and
an adjustment circuit to receive said reference current signal and said adjustment signal to generate said desired reference current waveforms.

7. The system according to claim 6, wherein said adjustment circuit uses the following equation $$i_{ref}(\theta, \omega_{ref}) = [I_{PI1}(\omega_{actual}, \theta) - I_{PI2}(I_{DC\ ripple})]$$

wherein $I_{PI1}$ is said adjustment signal and $I_{PI2}$ is said reference current signal.

8. A method for reducing DC input current ripple, comprising:
connecting an inverter to a capacitor and generating current signals;
receiving said current signals in a switched reluctance machine (SRM) which generates a ripple current received by said capacitor and a position signal;
receiving said ripple current, current signal values of said current signals and said position signal in a controller which generates desired reference current waveforms; and
receiving said desired reference current waveforms in said inverter to adjust said current signals in said SRM and reduce said ripple current.

9. The method according to claim 8, further comprising:
receiving said ripple current in a high pass filter from said capacitor and sending selected high frequency components of said ripple current to said controller.

10. The method according to claim 9, further comprising:
comparing said ripple current to a desired ripple current value for use in generating said desired reference current waveforms.

11. The method according to claim 10, further comprising:
converting said position signal to an actual speed signal; and
comparing said actual speed signal to a reference speed signal for use in generating said desired reference current waveforms.

12. The method according to claim 11, further comprising:
- receiving a difference between said actual speed signal and said reference speed signal in a first proportional integral controller which generates a reference current signal;
- receiving a difference between said ripple current and said desired ripple current in a second proportional integral controller which generates an adjustment signal; and
- receiving said reference current signal and said adjustment signal in an adjustment circuit to generate said desired reference current waveforms.

* * * * *

UNITED STATES PATENT AND TRADEMARK OFFICE
CERTIFICATE OF CORRECTION

Page 1 of 1

PATENT NO. : 11,128,248 B2
APPLICATION NO. : 16/969012
DATED : September 21, 2021
INVENTOR(S) : Yilmaz Sozer It is certified that error appears in the above-identified patent and that said Letters Patent is hereby corrected as shown below:

On the Title Page

Item (73), 'The University of Akron' should read --The University of Akron--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*